United States Patent
Ricard et al.

(10) Patent No.: US 12,375,695 B2
(45) Date of Patent: Jul. 29, 2025

(54) PROCESSING A POINT CLOUD

(71) Applicant: INTERDIGITAL CE PATENT HOLDINGS, SAS, Paris (FR)

(72) Inventors: Julien Ricard, Plouer-sur-Rance (FR); Celine Guede, Cesson Sevigne (FR); Joan Llach, London (GB)

(73) Assignee: InterDigital CE Patent Holdings, SAS, Paris (FR)

( * ) Notice: Subject to any disclaimer, the term of this patent is extended or adjusted under 35 U.S.C. 154(b) by 857 days.

(21) Appl. No.: 17/622,126

(22) PCT Filed: Jun. 22, 2020

(86) PCT No.: PCT/EP2020/067285
§ 371 (c)(1),
(2) Date: Dec. 22, 2021

(87) PCT Pub. No.: WO2021/001186
PCT Pub. Date: Jan. 7, 2021

(65) Prior Publication Data
US 2022/0385928 A1    Dec. 1, 2022

(30) Foreign Application Priority Data

Jul. 3, 2019 (EP) .................................... 19305910

(51) Int. Cl.
*H04N 19/30* (2014.01)
*H04N 19/136* (2014.01)
(Continued)

(52) U.S. Cl.
CPC ........... *H04N 19/30* (2014.11); *H04N 19/136* (2014.11); *H04N 19/157* (2014.11); *H04N 19/463* (2014.11)

(58) Field of Classification Search
CPC .... H04N 19/30; H04N 19/136; H04N 19/157; H04N 19/463
See application file for complete search history.

(56) References Cited

U.S. PATENT DOCUMENTS

2015/0178594 A1    6/2015   Curington et al.
2018/0310023 A1    10/2018  Tourapis et al.
(Continued)

FOREIGN PATENT DOCUMENTS

JP    2021-528917 A    10/2021
WO    2019066191 A1    4/2019
(Continued)

OTHER PUBLICATIONS

Wang, Ye-Kui, "On V-PCC high-level syntax", International Organization for Standardization, ISO/IEC JTC1/SC29/WG11, Coding of Moving Pictures and Audio, Document: MPEG2019/M48852, Gothenburg, Sweden, Jul. 2019, 3 pages.

(Continued)

*Primary Examiner* — David Perlman
(74) *Attorney, Agent, or Firm* — Condo Roccia Koptiw LLP

(57) ABSTRACT

At least one embodiment relates to methods for encoding, signaling and decoding a 3D point cloud with different layers associated with Point Local Reconstruction information and modes. A layer may be associated with its own information and modes or associated metadata may comprise indexes to information or modes encoded or decoded in relation with a different layer.

13 Claims, 8 Drawing Sheets

(51) Int. Cl.
*H04N 19/157* (2014.01)
*H04N 19/463* (2014.01)

(56) References Cited

U.S. PATENT DOCUMENTS

2021/0005006 A1* 1/2021 Oh .................. H04N 21/85406
2023/0132473 A1   5/2023 Lee et al.

FOREIGN PATENT DOCUMENTS

WO   2019/093834 A1   5/2019
WO   2020-005365 A1   1/2020

OTHER PUBLICATIONS

Guede et al., "Spatially Adaptive Geometry and Texture Interpolation", International Organization for Standardization, ISO/IEC JTC1/SC29/WG11, Coding of Moving Picture and Audio, Document: MPEG2018/m43658, 123rd Meeting, Ljubljana, Slovenia, Jul. 2018, 5 pages.

Anonymous, "High Efficiency Video Coding", Telecommunication Standardization Sector of ITU, Series H: Audiovisual and Multimedia Systems, Infrastructure of audiovisual services—Coding of moving video, Recommendation ITU-T H.265, Feb. 2018, 692 pages.

Hoppe et al., "Surface Reconstruction from Unorganized Points", SIGGRAPH '92: Proceedings of the 19th Annual Conference on Computer Graphics and Interactive Techniques, Jul. 1992, 8 pages.

Zakharchenko, Vladyslav, "V-PCC Codec Description", International Organization for Standardization, ISO/IEC JTC1/SC29/WG11, Coding of Moving Pictures and Audio, Document: MPEG2019/N18190, Marrakech, Morocco, Jan. 2019, 38 pages.

Guede et al., "Proposal for Syntax Extension for PLR Multi-Layer", International Organization for Standardization, ISO/IEC JTC1/SC29/WG11, Coding of Moving Pictures and Audio, Document: MPEG2019/M49233, Gothenburg, Sweden, Jul. 2019, 6 pages.

Guede et al., "Improvement on PLRM Metadata Coding using Neighborhood", International Organization for Standardization, ISO/IEC JTC1/SC29/WG11, MPEG2018/ m46095,125th Meeting, Marrakesh, Morocco, Jan. 2019, 4 pages.

Chiariglione, et al., "Continuous improvement of Study Text of ISO/IEC CD 23090-5 Video-based Point Cloud Compression", International Organization for Standardization ISO/IEC JTC 1/SC 29/WG 11 N18479, Italy, May 8, 2019, 140 pages.

* cited by examiner

PROCESSING A POINT CLOUD

CROSS REFERENCE TO RELATED APPLICATIONS

This application is a U.S. National Stage Application under 35 U.S.C. 371 of International Patent Application No. PCT/EP2020/067285, filed Jun. 22, 2020, which is incorporated herein by reference in its entirety.

This application claims the benefit of European Patent Application No. 19305910, filed Jul. 3, 2019, which is incorporated herein by reference in its entirety.

TECHNICAL FIELD

At least one of the present embodiments relates generally to a processing of a point cloud.

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allows for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

The automotive industry and the autonomous car are also domains in which point clouds may be used. Autonomous cars should be able to "probe" their environment to make good driving decisions based on the reality of their immediate neighbors. Typical sensors like LIDARs (Light Detection And Ranging) produce dynamic point clouds that are used by a decision engine. These point clouds are not intended to be viewed by a human being and they are typically small, not necessarily colored, and dynamic with a high frequency of capture. These point clouds may have other attributes like the reflectance provided by the LIDAR as this attribute provides good information on the material of the sensed object and may help in making decisions.

Virtual Reality and immersive worlds have become hot topics recently and are foreseen by many as the future of 2D flat video. The basic idea is to immerse the viewer in an environment that surrounds the viewer, in contrast to a standard TV in which the viewer can only look at the virtual world in front of the viewer. There are several gradations in the immersivity depending on the freedom of the viewer in the environment. A point cloud is a good format candidate for distributing Virtual Reality (VR) worlds.

It is important in many applications to be able to distribute dynamic point clouds to an end-user (or store them in a server) by consuming only a reasonable amount of bit-rate (or storage space for storage applications) while maintaining an acceptable (or preferably very good) quality of experience. Efficient compression of these dynamic point clouds is a key point in order to make the distribution chain of many immersive worlds practical.

At least one embodiment has been devised with the foregoing in mind.

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method comprising decoding a first layered image and associated first metadata from a data stream. The metadata comprise a first flag indicating whether the first layered image is to be decoded according to a point local reconstruction method. If the first flag is enabled, the method further comprises retrieving first point local reconstruction information and first point local reconstruction modes in said first metadata; and applying said first point local reconstruction modes to said first layered image according to said first point local reconstruction information to reconstruct said 3D point cloud.

According to other aspects, the point local reconstruction information and/or modes may be omitted in metadata if an index allowing to retrieve these data from metadata associated with another layer is indicated in the metadata of the current layer.

According to another aspect, there is provided a second method. The method comprises encoding a first layered image and associated first metadata in a data stream. The metadata comprise:

a first flag indicating whether the first layered image is to be decoded according to a point local reconstruction method; and if the first flag is enabled, a first point local reconstruction information and first point local reconstruction modes.

According to other aspects of the second method, the point local reconstruction information and/or modes may be omitted in metadata if an index allowing to retrieve these data from metadata associated with another layer is indicated in the metadata of the current layer.

According to another aspect, there is provided an apparatus. The apparatus comprises a processor. The processor can be configured to encode or decode a 3D point cloud by executing either of the aforementioned methods.

According to another general aspect of at least one embodiment, there is provided a signal comprising data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

BRIEF DESCRIPTION OF DRAWINGS

In the drawings, examples of several embodiments are illustrated. The drawings show.

DETAILED DESCRIPTION

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

Some figures represent syntax tables widely used in V-PCC for defining the structure of a bitstream that conforms with V-PCC. In those syntax tables, the term ' . . . ' denotes unchanged portions of the syntax with respect to the original definition given in V-PCC and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

The aspects described and contemplated below may be implemented in many different forms. The figures provide some embodiments, but other embodiments are contemplated, and the discussion of the figures does not limit the breadth of the implementations.

At least one of the aspects generally relates to point cloud encoding and decoding, and at least one other aspect generally relates to transmitting a bitstream generated or encoded.

Figure 3:
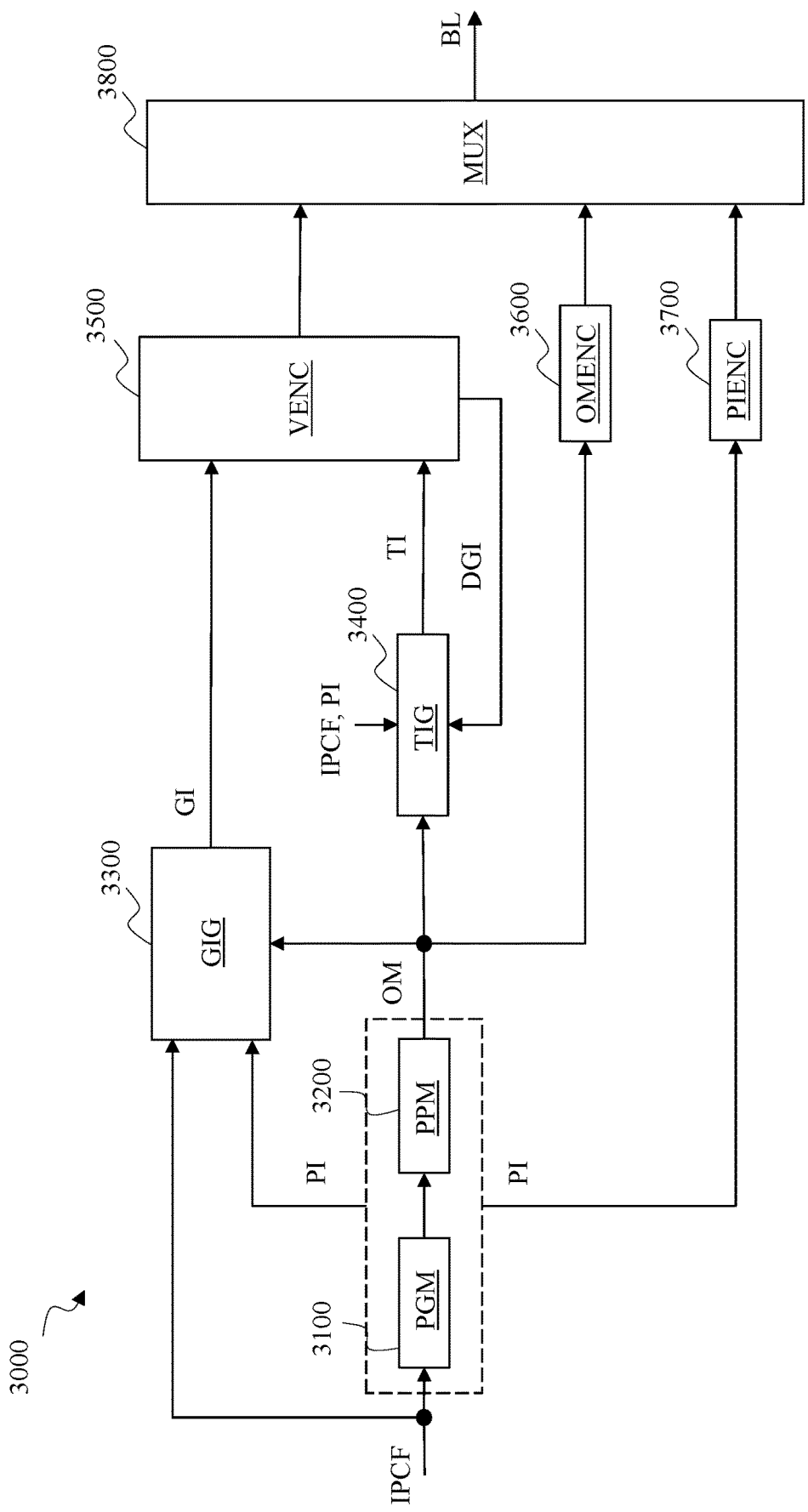
FIG. 3 illustrates a schematic block diagram of an example of an image-based point cloud encoder in accordance with at least one of the present embodiments.
Figure 4:
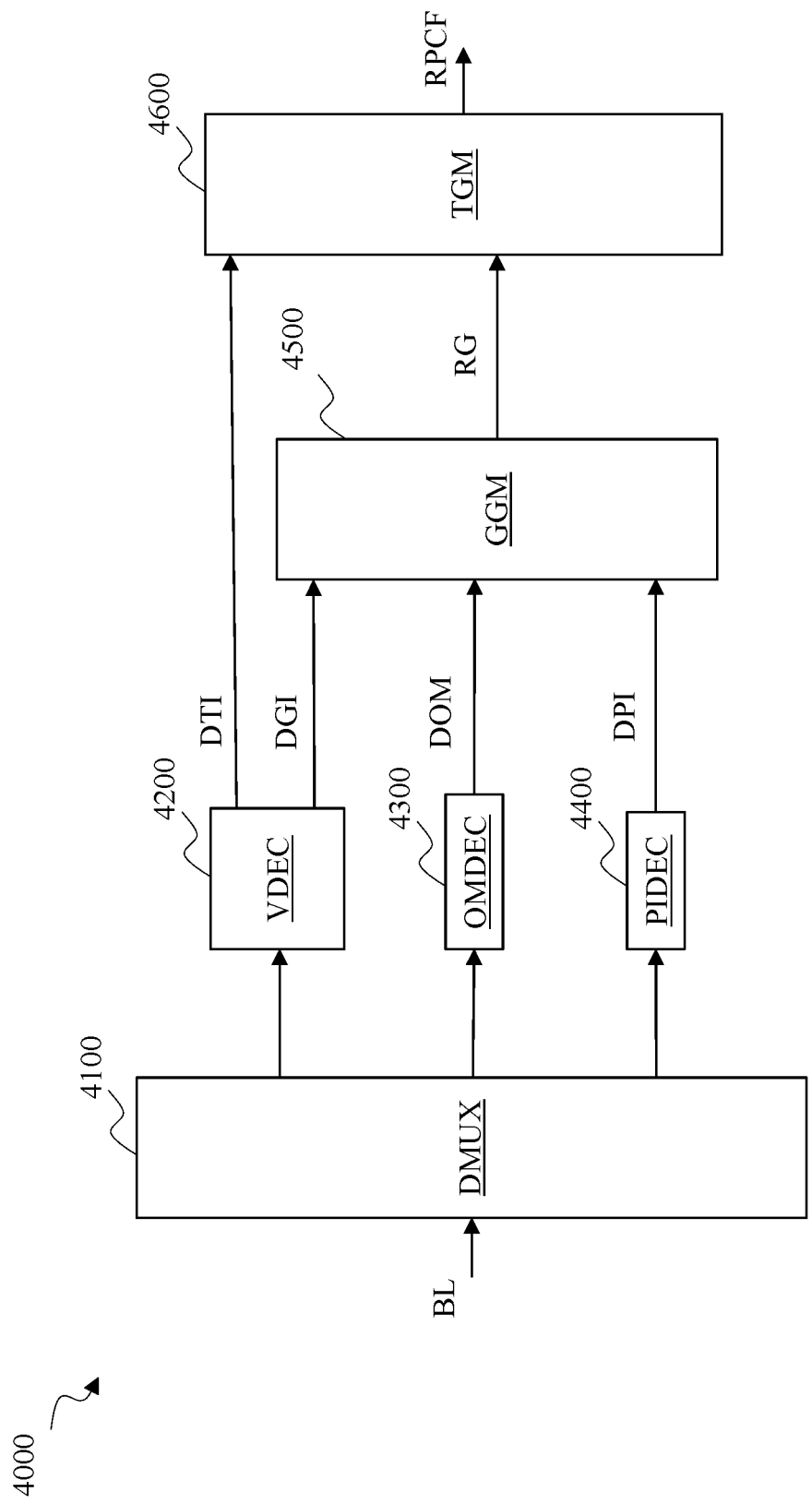
FIG. 4 illustrates a schematic block diagram of an example of an image-based point cloud decoder in accordance with at least one of the present embodiments.

More precisely, various methods and other aspects described herein may be used to modify modules, for example, modules related to metadata encoding such as those that take places in patch information encoder 3700 of FIG. 3 and modules related to metadata decoding such as those that take places in the patch information decoder 4400 of FIG. 4, or in the reconstruction process in the geometry generation module 4500 of FIG. 4).

Moreover, the present aspects are not limited to MPEG standards such as MPEG-I part 5 that relates to the Point Cloud Compression, and may be applied, for example, to other standards and recommendations, whether pre-existing or future-developed, and extensions of any such standards and recommendations (including MPEG-I part 5). Unless indicated otherwise, or technically precluded, the aspects described in this application may be used individually or in combination.

In the following, image data refer to data, for example, one or several arrays of 2D samples in a specific image/video format. A specific image/video format may specify information pertaining to pixel values of an image (or a video). A specific image/video format may also specify information which may be used by a display and/or any other apparatus to visualize and/or decode an image (or video) for example. An image typically includes a first component, in the shape of a first 2D array of samples, usually representative of luminance (or luma) of the image. An image may also include a second component and a third component, in the shape of other 2D arrays of samples, usually representative of the chrominance (or chroma) of the image. Some embodiments represent the same information using a set of 2D arrays of color samples, such as the traditional tri-chromatic RGB representation.

A pixel value is represented in one or more embodiments by a vector of C values, where C is the number of components. Each value of a vector is typically represented with a number of bits which may define a dynamic range of the pixel values.

An image block means a set of pixels which belong to an image. The pixel values of an image block (or image block data) refer to the values of the pixels which belong to this image block. An image block may have an arbitrary shape, although rectangles are common.

A point cloud may be represented by a dataset of 3D samples within a 3D volumetric space that have unique coordinates and that may also have one or more attributes.

A 3D sample of this data set may be defined by its spatial location (X, Y, and Z coordinates in a 3D space) and possibly by one or more associated attributes such as a color, represented in the RGB or YUV color space for example, a transparency, a reflectance, a two-component normal vector or any feature representing a feature of this sample. For example, a 3D sample may be defined by 6 components (X, Y, Z, R, G, B) or equivalently (X, Y, Z, y, U, V) where (X, Y, Z) defines the coordinates of a point in a 3D space and (R,G,B) or (y,U,V) defines a color of this 3D sample. The same type of attribute may be present multiple times. For example, multiple color attributes may provide color information from different points of view.

A point cloud may be static or dynamic depending on whether or not the cloud changes with respect to time. A static point cloud or an instance of a dynamic point cloud is usually denoted as a point cloud frame. It should be noticed that in the case of a dynamic point cloud, the number of points is generally not constant but, on the contrary, generally changes with time. More generally, a point cloud may be considered as dynamic if anything changes with time, such as, for example, the number of points, the position of one or more points, or any attribute of any point.

As an example, a 2D sample may be defined by 6 components (u, v, Z, R, G, B) or equivalently (u, v, Z, y, U, V). (u,v) defines the coordinates of a 2D sample in a 2D space of the projection plane. Z is the depth value of a projected 3D sample onto this projection plane. (R,G,B) or (y,U,V) defines a color of this 3D sample.

According to the present principles, a flag is an information encoded in a data stream indicating whether a condition is enabled. For instance, a flag is an information indicating whether an action has to be performed by a processor when encoding or decoding the data stream. In another example, a flag is an information indicating whether a sequence of bits in the data stream obey a given syntax. A flag may also be a first information indicating whether a second information is encoded in the data stream. The flag is said enabled when the condition is obeyed. A flag may be encoded by different ways and/or sequences of bits in the data stream.

Figure 1:
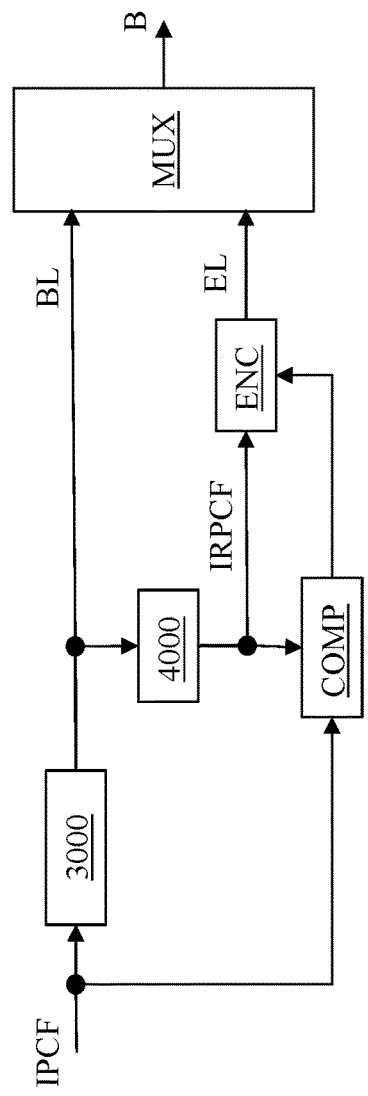
FIG. 1 illustrates a schematic block diagram of an example of a two-layer-based point cloud encoding structure in accordance with at least one of the present embodiments.

FIG. 1 illustrates a schematic block diagram of an example of a two-layer-based point cloud encoding structure 1000 in accordance with at least one of the present embodiments.

The two-layer-based point cloud encoding structure 1000 may provide a bitstream B representative of an input point cloud frame IPCF. Possibly, said input point cloud frame IPCF represents a frame of a dynamic point cloud. Then, a frame of said dynamic point cloud may be encoded by the two-layer-based point cloud encoding structure 1000 independently from another frame.

Basically, the two-layer-based point cloud encoding structure 1000 may provide ability to structure the bitstream B as a Base Layer BL and an Enhancement Layer EL. The base layer BL may provide a lossy representation of an input point cloud frame IPCF and the enhancement layer EL may provide a higher quality (possibly lossless) representation by encoding isolated points not represented by the base layer BL.

The base layer BL may be provided by an image-based encoder 3000 as illustrated in FIG. 3. Said image-based encoder 3000 may provide geometry/texture images representing the geometry/attributes of 3D samples of the input point cloud frame IPCF. It may allow isolated 3D samples to be discarded. The base layer BL may be decoded by an image-based decoder 4000 as illustrated in FIG. 4 that may provide an intermediate reconstructed point cloud frame IRPCF.

Then, back to the two-layer-based point cloud encoding 1000 in FIG. 1, a comparator COMP may compare the 3D samples of the input point cloud frame IPCF to the 3D samples of the intermediate reconstructed point cloud frame IRPCF in order to detect/locate missed/isolated 3D samples. Next, an encoder ENC may encode the missed 3D samples and may provide the enhancement layer EL. Finally, the base layer BL and the enhancement layer EL may be multiplexed together by a multiplexer MUX so as to generate the bitstream B.

According to an embodiment, the encoder ENC may comprise a detector that may detect and associate a 3D reference sample R of the intermediate reconstructed point cloud frame IRPCF to a missed 3D samples M.

For example, a 3D reference sample R associated with a missed 3D sample M may be its nearest neighbor of M according to a given metric.

According to an embodiment, the encoder ENC may then encode the spatial locations of the missed 3D samples M and their attributes as differences determined according to spatial locations and attributes of said 3D reference samples R.

In a variant, those differences may be encoded separately.

For example, for a missed 3D sample M, with spatial coordinates x(M), y(M) and z(M), a x-coordinate position difference Dx(M), a y-coordinate position difference Dy(M), a z-coordinate position difference Dz(M), a R-attribute component difference Dr(M), a G-attribute component difference Dg(M) and the B-attribute component difference Db(M) may be calculated as follows:

$$Dx(M)=x(M)-x(R),$$

where x(M) is the x-coordinate of the 3D sample M, respectively R in a geometry image provided by FIG. 3, $$Dy(M)=y(M)-y(R)$$

where y(M) is the y-coordinate of the 3D sample M, respectively R in a geometry image provided by FIG. 3, $$Dz(M)=z(M)-z(R)$$

where z(M) is the z-coordinate of the 3D sample M, respectively R in a geometry image provided by FIG. 3, $$Dr(M)=R(M)-R(R).$$

where R(M), respectively R(R) is the r-color component of a color attribute of the 3D sample M, respectively R, $$Dg(M)=G(M)-G(R).$$

where G(M), respectively G(R) is the g-color component of a color attribute of the 3D sample M, respectively R, $$Db(M)=B(M)-B(R).$$

where B(M), respectively B(R) is the b-color component of a color attribute of the 3D sample M, respectively R.

Figure 2:
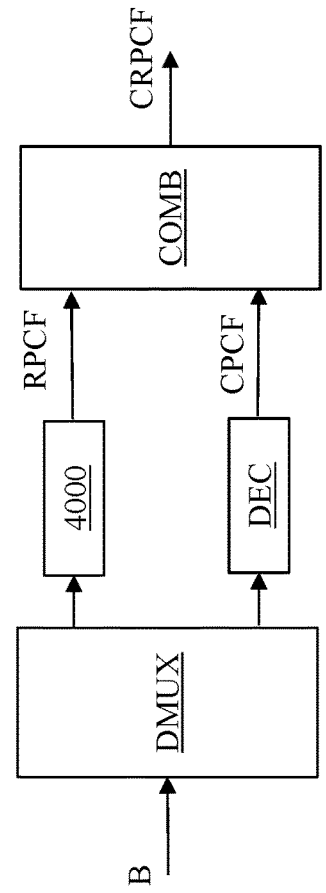
FIG. 2 illustrates a schematic block diagram of an example of a two-layer-based point cloud decoding structure in accordance with at least one of the present embodiments.

FIG. 2 illustrates a schematic block diagram of an example of a two-layer-based point cloud decoding structure 2000 in accordance with at least one of the present embodiments.

The behavior of the two-layer-based point cloud decoding structure 2000 depends on its capabilities.

A two-layer-based point cloud decoding structure 2000 with limited capabilities may access only the base layer BL from the bitstream B by using a de-multiplexer DMUX, and then may provide a faithful (but lossy) version IRPCF of the input point cloud frame IPCF by decoding the base layer BL by a point cloud decoder 4000 as illustrated in FIG. 4.

A two-layer-based point cloud decoding structure 2000 with full capabilities may access both the base layer BL and the enhancement layer EL from the bitstream B by using the de-multiplexer DMUX. The point cloud decoder 4000, as illustrated in FIG. 4, may determine the intermediate reconstructed point cloud frame IRPCF from the base layer BL. The decoder DEC may determine a complementary point cloud frame CPCF from the enhancement layer EL. A combiner COM then may combine together the intermediate reconstructed point cloud frame IRPCF and the complementary point cloud frame CPCF to therefore provide a higher quality (possibly lossless) representation (reconstruction) CRPCF of the input point cloud frame IPCF.

FIG. 3 illustrates a schematic block diagram of an example of an image-based point cloud encoder 3000 in accordance with at least one of the present embodiments.

The image-based point cloud encoder 3000 leverages existing video codecs to compress the geometry and texture (attribute) information of a dynamic point cloud. This is accomplished by essentially converting the point cloud data into a set of different video sequences.

In particular embodiments, two videos, one for capturing the geometry information of the point cloud data and another for capturing the texture information, may be generated and compressed using existing video codecs. An example of an existing video codec is the HEVC Main profile encoder/decoder (ITU-T H.265 Telecommunication standardization sector of ITU (02/2018), series H: audiovisual and multimedia systems, infrastructure of audiovisual services—coding of moving video, High efficiency video coding, Recommendation ITU-T H.265).

Additional metadata that are used to interpret the two videos are typically also generated and compressed separately. Such additional metadata includes, for example, an occupancy map OM and/or auxiliary patch information PI.

The generated video bitstreams and the metadata may be then multiplexed together so as to generate a combined bitstream.

It should be noted that the metadata typically represents a small amount of the overall information. The bulk of the information is in the video bitstreams.

An example of such a point cloud coding/decoding process is given by the Test model Category 2 algorithm (also denoted V-PCC) that implements the MPEG draft standard as defined in ISO/IEC JTC1/SC29/WG11 MPEG2019/w18180 (January 2019, Marrakesh).

In step 3100, a module PGM may generate at least one patch by decomposing 3D samples of a data set representative of the input point cloud frame IPCF to 2D samples on a projection plane using a strategy that provides best compression.

A patch may be defined as a set of 2D samples.

For example, in V-PCC, a normal at every 3D sample is first estimated as described, for example, in Hoppe et al. (Hugues Hoppe, Tony DeRose, Tom Duchamp, John McDonald, Werner Stuetzle. Surface reconstruction from unorganized points. ACM SIGGRAPH 1992 Proceedings, 71-78). Next, an initial clustering of the input point cloud frame IPCF is obtained by associating each 3D sample with one of the six oriented planes of a 3D bounding box encompassing the 3D samples of the input point cloud frame IPCF. More precisely, each 3D sample is clustered and associated with an oriented plane that has the closest normal (that is maximizes the dot product of the point normal and the plane normal). Then the 3D samples are projected to their associated planes. A set of 3D samples that forms a connected area in their plane is referred as a connected component. A connected component is a set of at least one 3D sample having similar normal and a same associated oriented plane. The initial clustering is then refined by iteratively updating the cluster associated with each 3D sample based on its normal and the clusters of its nearest neighboring samples. The final step consists of generating one patch from each connected component, that is done by projecting the 3D samples of each connected component onto the oriented plane associated with said connected component. A patch is associated with auxiliary patch information PI that represents auxiliary patch information defined for each patch to interpret the projected 2D samples that correspond to the geometry and/or attribute information.

In V-PCC, for example, the auxiliary patch information PI includes 1) information indicating one of the six oriented planes of a 3D bounding box encompassing the 3D samples of a connected component; 2) information relative to the plane normal; 3) information determining the 3D location of a connected component relative to a patch represented in terms of depth, tangential shift and bi-tangential shift; and 4) information such as coordinates (u0, v0, u1, v1) in a projection plane defining a 2D bounding box encompassing a patch.

In step 3200, a patch packing module PPM may map (place) at least one generated patch onto a 2D grid (also called canvas) without any overlapping in a manner that typically minimizes the unused space, and may guarantee that every T×T (for example, 16×16) block of the 2D grid is associated with a unique patch. A given minimum block size T×T of the 2D grid may specify the minimum distance between distinct patches as placed on this 2D grid. The 2D grid resolution may depend on the input point cloud size and its width W and height H and the block size T may be transmitted as metadata to the decoder.

The auxiliary patch information PI may further include information relative to an association between a block of the 2D grid and a patch.

In V-PCC, the auxiliary information PI may include a block to patch index information (BlockToPatch) that determines an association between a block of the 2D grid and a patch index.

Figure 3A:
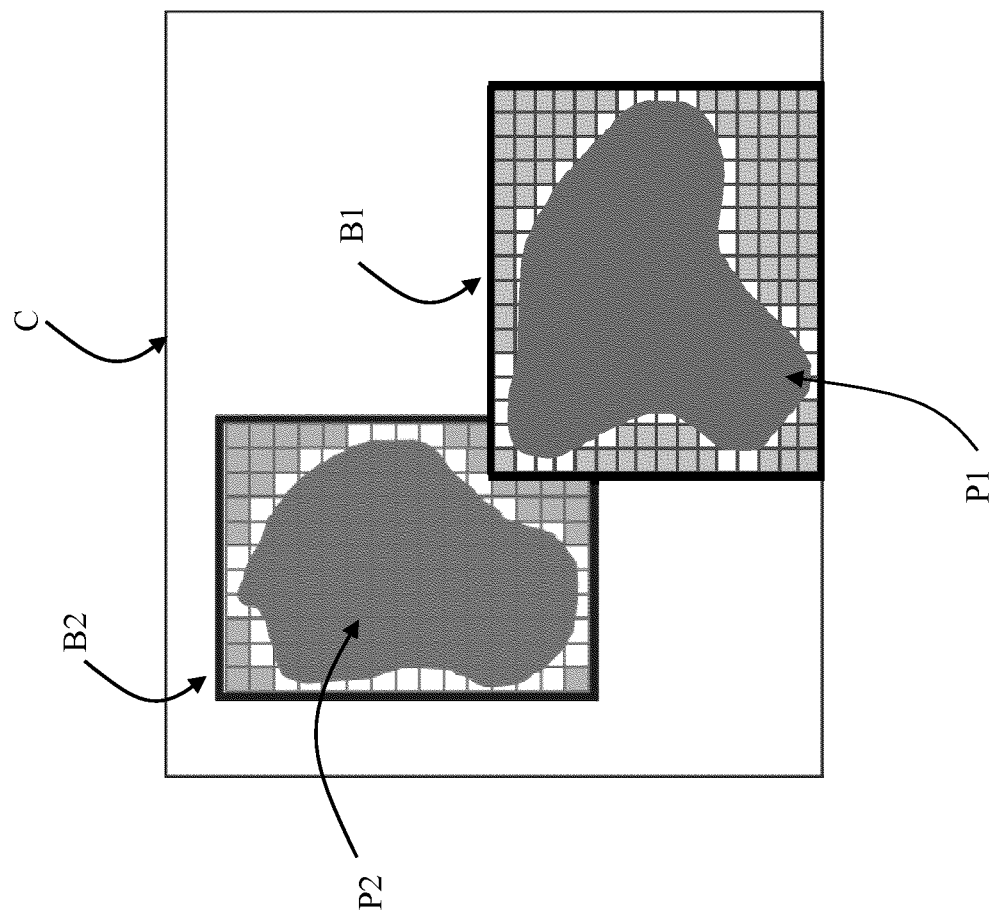
FIG. 3a illustrates an example of a canvas comprising 2 patches and their 2D bounding boxes.

FIG. 3*a* illustrates an example of a canvas C comprising 2 patches P1 and P2 and their associated 2D bounding boxes B1 and B2. Note that two bounding boxes may overlap in the canvas C as illustrated on FIG. 3*a*. The 2D grid (the splitting of the canvas) is only represented inside the bounding box but the splitting of the canvas also occurs outside those bounding boxes. A bounding box associated with a patch can be split into T×T blocks, typically T=16.

T×T blocks containing 2D samples belonging to a patch may be considered as occupied blocks in the corresponding occupancy map OM. A block of the occupancy map OM may then indicate whether a block is occupied, that is contains 2D samples that belong to a patch.

In FIG. 3*a*, an occupied block is represented by a white block and light grey blocks represent unoccupied blocks. The image generation processes (steps 3300 and 3400) exploit the mapping of the at least one generated patch onto the 2D grid computed during step 3200, to store the geometry and texture of the input point cloud frame IPCF as images.

In step 3300, a geometry image generator GIG may generate at least one geometry image GI from the input point cloud frame IPCF, the occupancy map OM and the auxiliary patch information PI. The geometry image generator GIG may exploit the occupancy map information in order to detect (locate) the occupied blocks and thus the non-empty pixels in the geometry image GI.

A geometry image GI may represent the geometry of the input point cloud frame IPCF and may be a monochromatic image of W×H pixels represented, for example, in YUV420-8 bit format.

In order to better handle the case of multiple 3D samples being projected (mapped) to a same 2D sample of the projection plane (along a same projection direction (line)), multiple images, referred to as layers, may be generated. Thus, different depth values D1, . . . , Dn may be associated with a 2D sample of a patch and multiple geometry images may then be generated.

In V-PCC, 2D samples of a patch are projected onto two layers. A first layer, also called the near layer, may store, for example, the depth values D0 associated with the 2D samples with smaller depths. A second layer, referred to as the far layer, may store, for example, the depth values D1 associated with the 2D samples with larger depths. Alternatively, the second layer may store difference values between depth values D1 and D0. For example, the information stored by the second depth image may be within an interval $[0, \Delta]$ corresponding to depth values in the range $[D0, D0+\Delta]$, where $\Delta$ is a user-defined parameter that describes the surface thickness.

By this way, the second layer may contain significant contour-like high frequency features. Thus, it clearly appears that the second depth image may be difficult to code by using a legacy video coder and, therefore, the depth values may be poorly reconstructed from said decoded second depth image, which results on a poor quality of the geometry of the reconstructed point cloud frame.

According to an embodiment, the geometry image generating module GIG may code (derive) depth values associated with 2D samples of the first and second layers by using the auxiliary patch information PI.

In V-PCC, the location of a 3D sample in a patch with a corresponding connected component may be expressed in terms of depth $\delta(u, v)$, tangential shift $s(u, v)$ and bi-tangential shift $r(u, v)$ as follows:

$$\delta(u,v) = \delta 0 + g(u,v)$$

$$s(u,v) = s0 - u0 + u$$

$$r(u,v) = r0 - v0 + v$$

where $g(u, v)$ is the luma component of the geometry image, $(u,v)$ is a pixel associated with the 3D sample on a projection plane, $(\delta 0, s0, r0)$ is the 3D location of the corresponding patch of a connected component to which the 3D sample belongs and $(u0, v0, u1, v1)$ are the coordinates in said projection plane defining a 2D bounding box encompassing the projection of the patch associated with said connected component.

Thus, a geometry image generating module GIG may code (derive) depth values associated with 2D samples of a layer (first or second or both) as a luma component $g(u,v)$ given by: $g(u,v) = \delta(u, v) - \delta 0$. It is noted that this relationship may be employed to reconstruct 3D sample locations $(\delta 0, s0, r0)$ from a reconstructed geometry image $g(u, v)$ with the accompanying auxiliary patch information PI.

According to an embodiment, a projection mode may be used to indicate if a first geometry image GI0 may store the depth values of the 2D samples of either the first or second layer and a second geometry image GI1 may store the depth values associated with the 2D samples of either the second or first layer.

For example, when a projection mode equals 0, then the first geometry image GI0 may store the depth values of 2D samples of the first layer and the second geometry image GI1 may store the depth values associated with 2D samples of the second layer. Reciprocally, when a projection mode equals 1, then the first geometry image GI0 may store the depth values of 2D samples of the second layer and the second geometry image GI1 may store the depth values associated with 2D samples of the first layer.

According to an embodiment, a frame projection mode may be used to indicate if a fixed projection mode is used for all the patches or if a variable projection mode is used in which each patch may use a different projection mode.

The projection mode and/or the frame projection mode may be transmitted as metadata.

A frame projection mode decision algorithm may be provided, for example, in section 2.2.1.3.1 of V-PCC.

According to an embodiment, when the frame projection indicates that a variable projection mode may be used, a patch projection mode may be used to indicate the appropriate mode to use to (de-)project a patch.

A patch projection mode may be transmitted as metadata and may be, possibly, an information included in the auxiliary patch information PI.

A patch projection mode decision algorithm is provided, for example in section 2.2.1.3.2 of V-PCC.

According to an embodiment of step 3300, the pixel value in a first geometry image, for example GI0, corresponding to a 2D sample (u,v) of a patch may represent the depth values associated with at least one in-between 3D samples defined along a projection line corresponding to said 2D sample (u,v). Said in-between 3D samples reside along a projection line and share the same coordinates of the 2D sample (u,v) whose depth value D1 is coded in a second geometry image, for example GI1. Further, the said in-between 3D samples may have depth values between the depth value D0 and a depth value D1. A designated bit may be associated with each said in-between 3D samples which is set to 1 if the in-between 3D sample exists and 0 otherwise.

Then, all said designated bits along said projection line may be concatenated to form a codeword, called as Enhanced-Delta-Depth (EDD) code hereafter. Finally, all the EDD codes may be packed in an image, for example in the first geometry image GI1 or the occupancy map OM.

In step 3400, a texture image generator TIG may generate at least one texture image TI from the input point cloud frame IPCF, the occupancy map OM, the auxiliary patch information PI and a geometry of a reconstructed point cloud frame derived from at least one decoded geometry image DGI, output of a video decoder VDEC (step 4200 in FIG. 4).

A texture image TI may represent the texture of the input point cloud frame IPCF and may be an image of W×H pixels represented, for example, in YUV420-8 bit format.

The texture image generator TG may exploit the occupancy map information in order to detect (locate) the occupied blocks and thus the non-empty pixels in the texture image.

The texture image generator TIG may be adapted to generate and associate a texture image TI with each geometry image/layer DGI.

According to an embodiment, the texture image generator TIG may code (store) the texture (attribute) values TO associated with 2D samples of the first layer as pixel values of a first texture image TI0 and the texture values T1 associated with the 2D samples of the second layer as pixel values of a second texture image TI1.

Alternatively, the texture image generating module TIG may code (store) the texture values T1 associated with 2D samples of the second layer as pixel values of the first texture image TI0 and the texture values D0 associated with the 2D samples of the first layer as pixel values of the second geometry image GI1.

For example, colors of 3D samples may be obtained as described in section 2.2.3, 2.2.4, 2.2.5, 2.2.8 or 2.5 of V-PCC.

According to an embodiment, a padding process may be applied on the geometry and/or texture image. The padding process may be used to fill empty space between patches to generate a piecewise smooth image suited for video compression.

An image padding example is provided in sections 2.2.6 and 2.2.7 of V-PCC.

In step 3500, a video encoder VENC may encode the generated images/layers TI and GI.

In step 3600, an encoder OMENC may encode the occupancy map as an image as detailed, for example, in section 2.2.2 of V-PCC. Lossy or lossless encoding may be used.

According to an embodiment, the video encoder ENC and/or OMENC may be a HEVC-based encoder.

In step 3700, an encoder PIENC may encode the auxiliary patch information PI and possibly additional metadata such as the block size T, the width W and height H of the geometry/texture images.

According to an embodiment, the auxiliary patch information may be differentially encoded (as defined, for example in section 2.4.1 of V-PCC).

In step 3800, a multiplexer may be applied to the generated outputs of steps 3500, 3600 and 3700, and as a result these outputs may be multiplexed together so as to generate a bitstream representative of the base layer BL. It should be noted that the metadata information represents a small fraction of the overall bitstream. The bulk of the information is compressed using the video codecs.

FIG. 4 illustrates a schematic block diagram of an example of an image-based point cloud decoder 4000 in accordance with at least one of the present embodiments.

In step 4100, a de-multiplexer DMUX may applied to demutiplex the encoded information of the bitstream representative of the base layer BL.

In step 4200, a video decoder VDEC may decode encoded information to derive at least one decoded geometry image DGI and at least one decoded texture image DTI.

In step 4300, a decoder OMDEC may decode encoded information to derive a decoded occupancy map DOM.

According to an embodiment, the video decoder VDEC and/or OMDEC may be a HEVC-based decoder.

In step 4400, a decoder PIDEC may decode encoded information to derive auxiliary patch information DPI.

Possibly, metadata may also be derived from the bitstream BL.

In step 4500, a geometry generating module GGM may derive the geometry RG of a reconstructed point cloud frame IRPCF from the at least one decoded geometry image DGI, the decoded occupancy map DOM, the decoded auxiliary patch information DPI and possible additional metadata.

The geometry generating module GGM may exploit the decoded occupancy map information DOM in order to locate the non-empty pixels in the at least one decoded geometry image DGI. The 3D coordinates of reconstructed 3D samples associated with non-empty pixels may then be derived from the coordinates of said non-empty pixels and the values of said reconstructed 2D samples.

According to an embodiment, the geometry generating module GGM may derive the 3D coordinates of reconstructed 3D samples from coordinates of non-empty pixels.

According to an embodiment, the geometry generating module GGM may derive the 3D coordinates of reconstructed 3D samples from coordinates of non-empty pixels, values of said non-empty pixels of one of the at least one decoded geometry image DGI, the decoded auxiliary patch information, and possibly, from additional metadata.

The use of non-empty pixels is based on 2D pixel relationship with 3D samples. For example, with the said projection in V-PCC, the 3D coordinates of reconstructed 3D samples may be expressed in terms of depth $\delta(u, v)$, tangential shift $s(u, v)$ and bi-tangential shift $r(u, v)$ as follows:

$$\delta(u,v)=\delta 0+g(u,v)$$

$$s(u,v)=s0-u0+u$$

$$r(u,v)=r0-v0+v$$

where $g(u, v)$ is the luma component of a decoded geometry image DGI, (u,v) is a pixel associated with a reconstructed 3D sample, ($\delta 0$, s0, r0) is the 3D location of a connected component to which the reconstructed 3D sample belongs and (u0, v0, u1, v1) are the coordinates in a projection plane defining a 2D bounding box encompassing the projection of a patch associate with said connected component.

In step 4600, a texture generating module TGM may derive the texture of the reconstructed point cloud frame IRPCF from the geometry RG and the at least one decoded texture image DTI.

Figure 5:
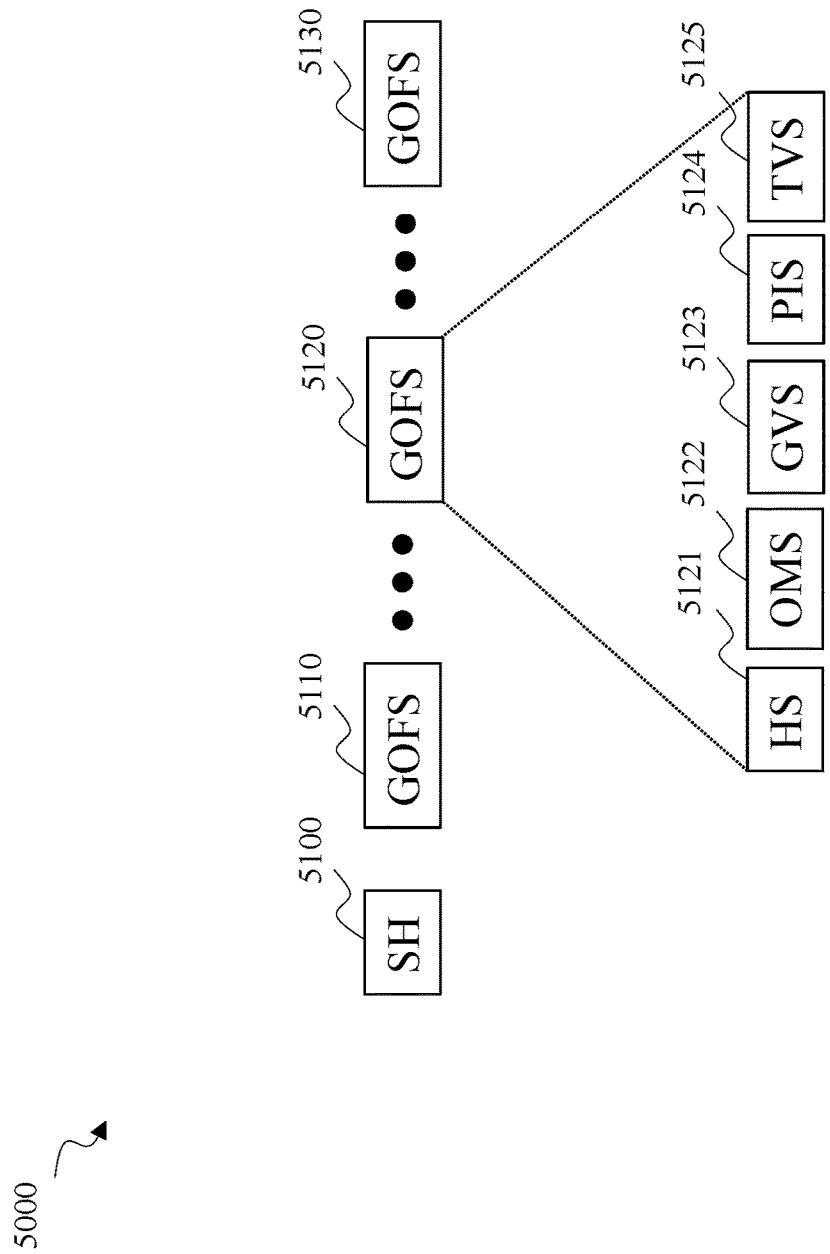
FIG. 5 illustrates schematically an example of syntax of a bitstream representative of a base layer BL in accordance with at least one of the present embodiments.

FIG. 5 illustrates schematically an example syntax of a bitstream representative of a base layer BL in accordance with at least one of the present embodiments.

The bitstream comprises a Bitstream Header SH and at least one Group Of Frame Stream GOFS.

A group of frame stream GOFS comprises a header HS, at least one syntax element OMS representative of an occupancy map OM, at least one syntax element GVS representative of at least one geometry image (or video), at least one syntax element TVS representative of at least one texture image (or video) and at least one syntax element PIS representative of auxiliary patch information and other additional metadata.

In a variant, a group of frame stream GOFS comprises at least one frame stream.

Figure 6:
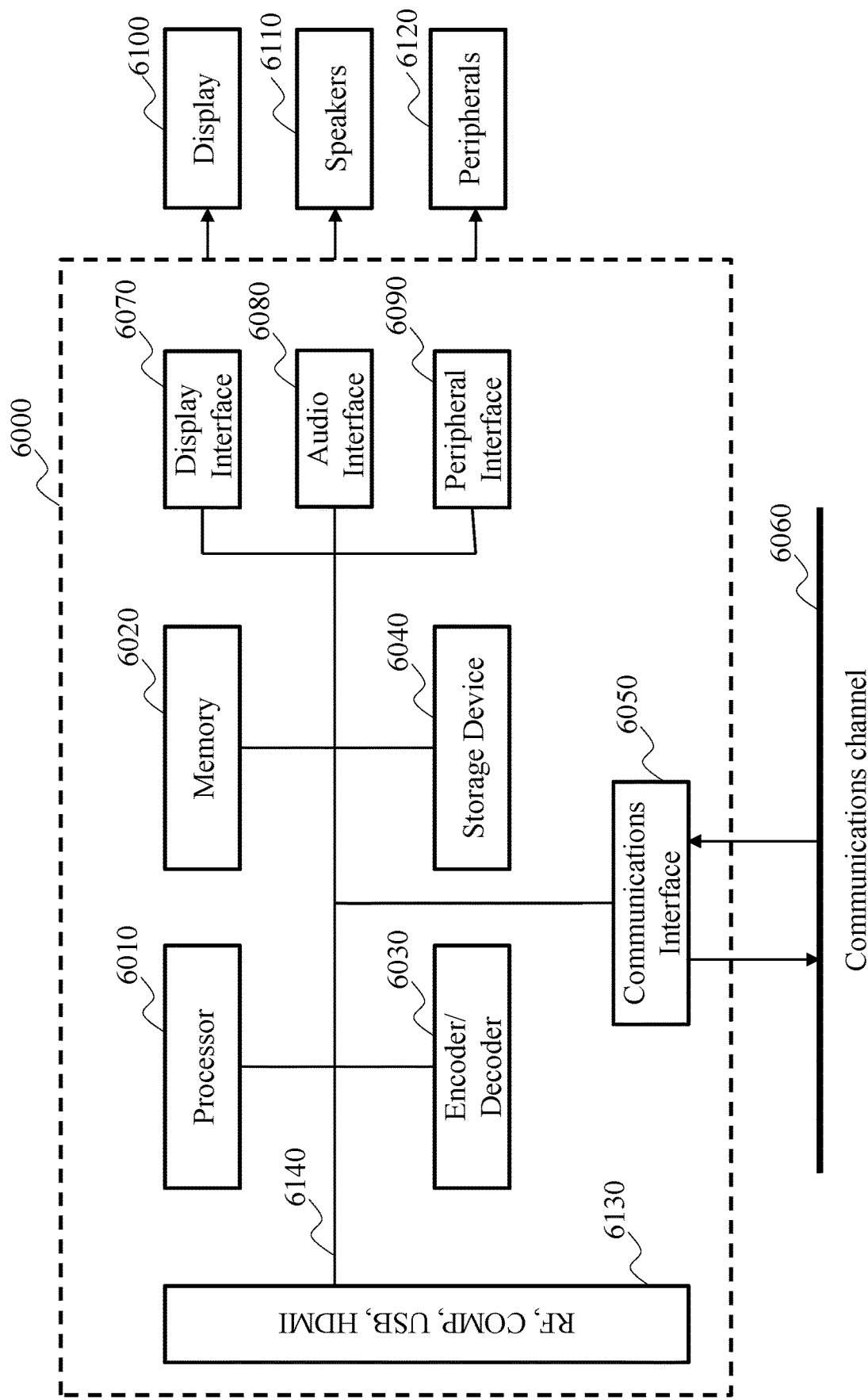
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface

6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

PLR stands for Point Local Reconstruction. PLR is a reconstruction method that may be used to generate additional 3D samples to a point cloud frame. PLR is typically applied immediately after a 2D to 3D projection, before any other processing like, for example, geometry or texture smoothing.

PLR takes a layer of 3D samples as input and applies a set of filters driven by PLR metadata to generate additional 3D samples, with their geometry and texture.

PLR may be local because PLR metadata may change per T×T block of the canvas and the set of filters may use a small neighborhood to generate the additional 3D samples. Note that same PLR metadata must be used in the encoder and the decoder.

In typical conditions, using a single layer of depth and texture images with PLR provides better BD-rate performance than two-layers of depth and texture images. The coding of PLR metadata takes fewer bits than conventional coding of 3D samples thru projection onto depth and texture images, therefore the overall bitrate is reduced. At the same time, the additional 3D samples compensate for the loss of quality caused by using fewer layers.

V-PCC includes an implementation of a PLR, where PLR is determined on encoder side by RDO (Rate-Distortion Optimization). Said implementation of PLR defines multiple modes, denoted PLRM (Point Local Reconstruction Mode), for reconstructing (generating) at least one 3D sample of a point cloud frame. Each PLRM is determined by specific values of PLRM metadata that defined how the filters are used.

For example, in section "9.4.4" of V-PCC, multiple PLRM are determined by four parameters described in section "7.4.35 Point local reconstruction semantics" of V-PCC. Said four parameters are transmitted as PLRM metadata in the bitstream:

point_local_reconstruction_mode_interpolate_flag:

This parameter equals 1 to indicate that point interpolation is used during the reconstruction method; This parameter equals 0 to indicate that no point interpolation is used during the reconstruction method;

point_local_reconstruction_mode_filling_flag

This parameter equals 1 to indicate that the filling mode is used during the reconstruction method; This parameter equals 0 to indicate that the filling mode is not used during the reconstruction process.

point_local_reconstruction_mode_minimum_depth_minus1: This parameter specifies the minimum depth value minus 1 to be used during the reconstruction method.

point_local_reconstruction_mode_neighbour_minus1:

This parameter specifies the size minus 1 of the 2D neighbourhood to be used in the reconstruction method.

A syntax for coding PLR is detailed in section "7.3.4.1" of V-PCC as defined in document w18479. This syntax describes the PLRM metadata sent by T×T block (the occupancy packing block size) through the "blockToPatch" information or by patch. The blockToPatch structure indicates for each block of T×T pixels the patch it belongs to. The size of 16×16 pixels for the block-to-patch block is the typical value used in the V-PCC test model software. The specification (and at least one of the present embodiments) may support other block sizes for block-to-patch index and PLRM metadata.

According to the present principle, it is possible, for an encoder, to generate several layers having PLR modes associated with. The layer concept allows capturing all those 3D points efficiently and the PLR method allow to reduce the bit rate required to encode such projection. The current test model supports up to 2 layers. Adding the possibility to use PLR in the two-layer mode allows increasing compression efficiency of the point cloud and keeping the reconstructed point cloud more faithful to the original.

There is no syntax and no method to encode and decode multiple layers, a layer having or not PLR metadata associated with. There is no signaling method to associate PLR information and/or modes to different layered images. To modify the existing syntax as described, for instance, in document w18479 of V-PCC standard is not straightforward as any modification implies an adaptation of the entire system. Moreover, the rough addition of PLR information and modes for every layer without any consideration of their use would lead to an overload of the bitrate. So, there is a lack for solutions, according to different embodiments, to encode, signal, transmit and decode 3D point clouds with an efficient use of PLR method on different layers of a projection. Such solutions are proposed in relation to FIGS. 7 and 8.

To modify PLR to an arbitrary number of layers requires to modify the actual 1-layer mode to each of the layers of a multi-layer mode. Several extensions are required:
  PLR per-block/per-patch parameters available for each layer.
  PLR information available for each layer.
  PLR reconstruction performed per layer.

It is understood that PLR information refers to the PLR look-up table of processing modes as well as to other high-level PLR parameters. The PLR information is coded in the point_local_reconstruction_information syntax structure. Depending on how the PLR metadata is sent, several embodiments are possible, for instance:
  Each layer has its own PLR information and per-block/per-patch mode.
  Several layers share the same PLR information, but per-block/-patch mode is provided per layer.
  Shared PLR information and shared PLR modes.

Figure 7:
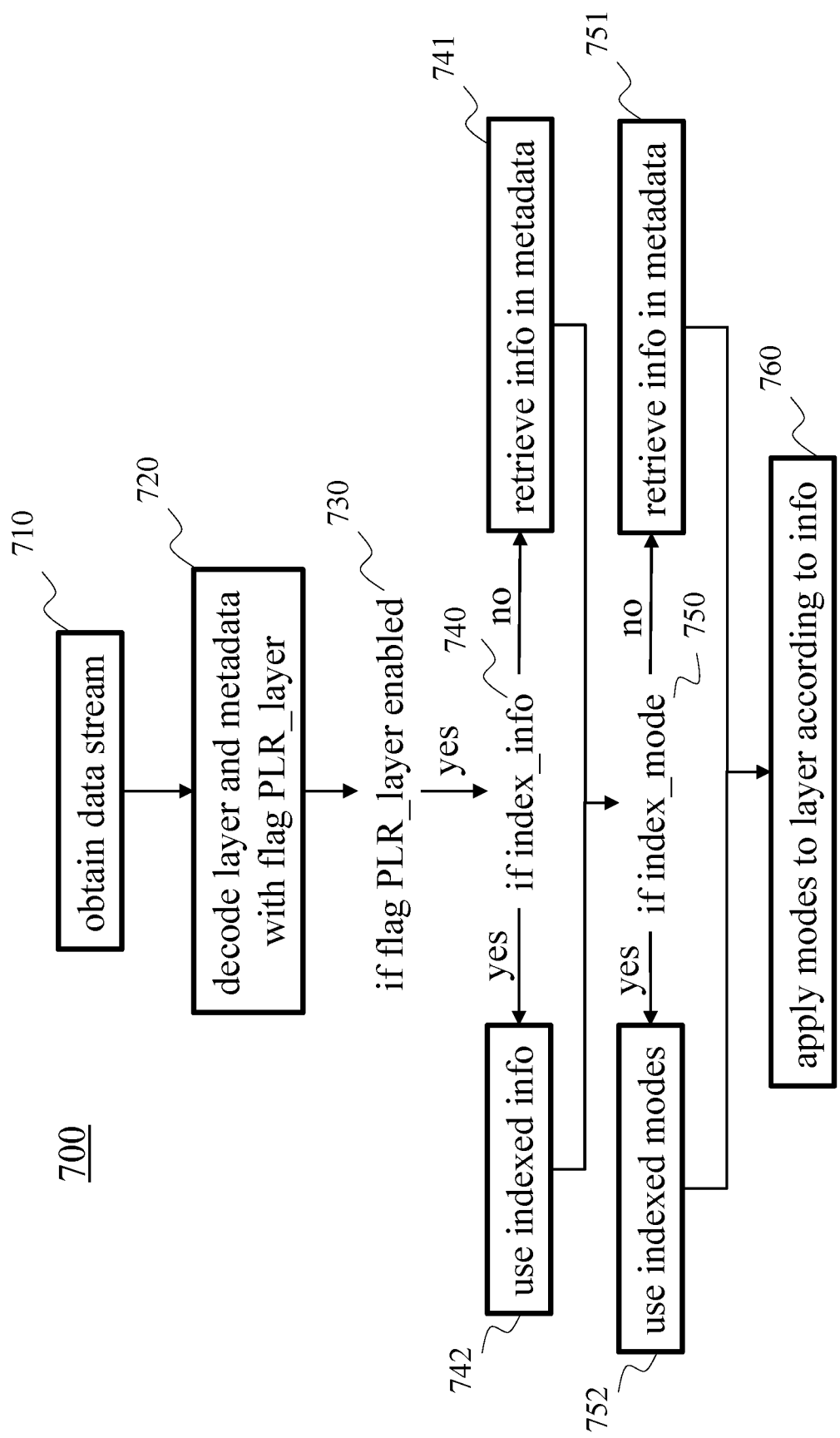
FIG. 7 diagrammatically shows a method 700 of decoding a 3D point cloud according to the present principles.
Figure 8:
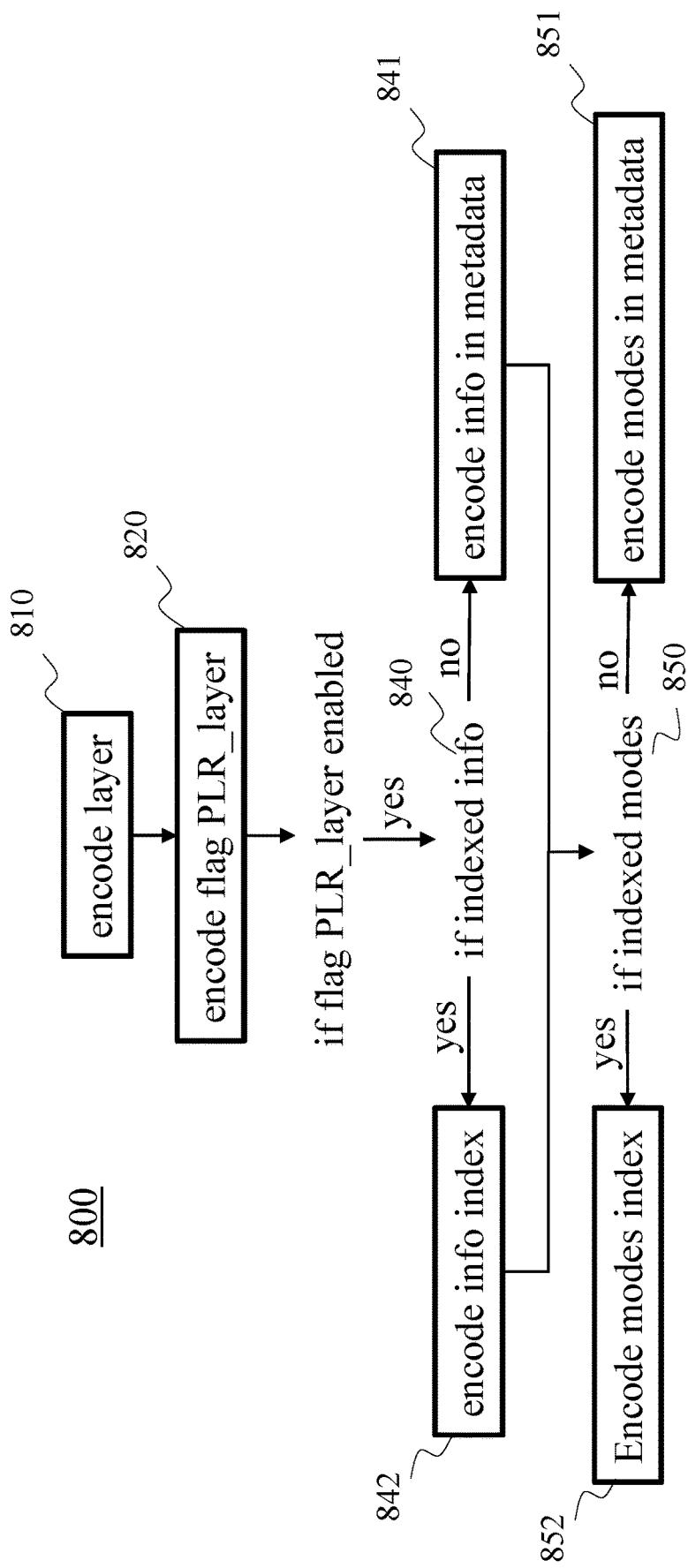
FIG. 8 diagrammatically shows a method 800 of encoding a 3D point cloud according to the present principles.

For clarity purposes, in FIGS. 7 and 8, syntax is shown in relation to current V-PCC syntax (available in document w18479).

FIG. 7 diagrammatically shows a method 700 of decoding a 3D point cloud according to the present principles. At a step 710 a data stream encoded according to the present principles is obtained from a source. The data stream comprise data representative of a 3D point cloud encoded with layered images. At a step 720, a layer is decoded from the stream. A layer image is associated with metadata that comprise at least a PLR flag indicating whether this layer has to be decoded according to the PLR method. Metadata associated with this layer are decoded from the stream. They may have been decoded at a different time and/or from a different location within the data stream. At a step 730, a test is performed to check if the PLR flag is enabled (e.g. a flag set to 1 is enabled). If the PLR flag is disabled, the layer is de-projected using legacy method. Otherwise, if the PLR flag is enabled, meaning that the PLR method applies to this layer, PLR information and modes for this layer have to be retrieved. At a step 740, a test is performed to check if metadata comprise an index pointing to a PLR information associated with another layer. If not, at a step 741, PLR information is retrieved from the metadata and stored in memory with an index allowing to retrieve it. If a PLR information index is provided in metadata of the current layer, then, PLR information is retrieved from memory thanks to this index at a step 742. At a step 750, a test is performed to check whether an index of PLR modes is provided in the metadata. Step 750 may occur before, after or in parallel to step 740. If no PLR modes index is provided, at a step 751, PLR modes for the current layer are retrieved from the metadata and stored in memory with an index allowing to retrieve them. If a PLR modes index is provided in metadata of the current layer, then, PLR modes are retrieved from memory thanks to this index at a step 752. At a step 760, the layer is de-projected using the PLR method by applying the retrieved modes to pixels of the layer according to the retrieved PLR information.

FIG. 8 diagrammatically shows a method 800 of encoding a 3D point cloud according to the present principles. At a step 810, a layer is obtained and encoded in a data stream. At the following steps, metadata associated with this current layer are encoded in the data stream. These metadata may be encoded before or after the layer in time and within the data stream. At a step 820, a PLR flag indicating whether the layer has to be decoded according to the PLR method is encoded in the metadata. If the PLR flag is enabled (e.g. a flag set to 1 is enabled), a test is performed at a step 840 to check whether the PLR information for the current layer has already been (or will be) encoded in metadata associated with a different layer. If not, then at a step 841, the PLR information for the current layer are encoded in metadata associated with this current layer. Otherwise, at a step 842, an index allowing to retrieve the PLR information of another layer is encoded. A test is performed at a step 850 to check whether the PLR modes for the current layer has already been (or will be) encoded in metadata associated with a different layer. Step 850 may be performed before, after or in parallel to step 840. If PLR modes are not shared with another layer, then at a step 851, the PLR modes for the current layer are encoded in metadata associated with this current layer. Otherwise, at a step 852, an index allowing to retrieve the PLR modes of another layer is encoded.

The following description details proposed changes to the syntax described in the current V-PCC specifications (w18479).

In an embodiment, each layer has its own PLR information and PLR per-block/per-patch mode. In this embodiment, the PLR parameters are optimized per layer.

At sequence parameter set syntax level (paragraph 7.3.4.1 of w18479), add the possibility to enable PLR process per layer, as follows:

|  | Descriptor |
|---|---|
| sequence_parameter_set( ) { | |
| [...] | |
|   sps_point_local_reconstruction_enabled_flag | u(1) |
|   if( sps_point_local_reconstruction_enabled_flag ) { | |
|     ~~point_local_reconstruction_information()~~ | |
|     for ( layer = 0 ; layer < sps_layer_count_minus1 + 1; layer ++ ) { | |
|       sps_point_local_reconstruction_layer_enabled_flag[ layer ] | u(1) |
|     } | |
|   } | |
| [...] | |
| } | | sps_pointjlocal_reconstructionJlayer_enabled_flag[layer] equal to 1 indicates that the local reconstruction mode may be used during the point cloud reconstruction process on the corresponding layer index. sps_point_local_reconstruction_layer_enabled_flag[layer] equal to 0 indicates that the local reconstruction mode shall not be used during the point cloud reconstruction process on the corresponding layer index.

At patch sequence parameter set syntax level (paragraph 7.3.5.3 of wi8479), add the possibility to define a PLR information per layer, as follows:

| | Descriptor |
|---|---|
| patch_sequence_parameter_set( ) {<br>[...]<br>  if( sps_point_local_reconstruction_enabled_flag )<br>    for ( layer = 0 ; layer < sps_layer_count_minus1 + 1;<br>    layer ++ ) {<br>      if ( sps_point_local_reconstruction_layer_enabled_flag<br>[ layer ] ) {<br>        point_local_reconstruction_information( layer )<br>      }<br>    }<br>  byte_alignement( )<br>} | |

The point-local-reconstruction-information(layer) syntax method is modified so that the parameters are store at index 'layer' of the point local reconstruction information array. The modified method is shown in section 3.2.2.

The patch data unit syntax (paragraph 7.3.6.3 of w18479) is modified as follows:

| | Descriptor |
|---|---|
| patch_data_unit( patchIndex ) {<br>[...]<br>  if( sps_point_local_reconstruction_enabled_flag ) {<br>    ~~point_local_reconstruction_data(patchIndex)~~<br>    for ( layer = 0 ; layer < sps_layer_count_minus1 + 1;<br>    layer ++ ) {<br>      if (sps_point_local_reconstruction_layer_enabled_flag<br>      [ layer ] ) {<br>        point_local_reconstruction_data( patchIndex, layer)<br>      }<br>    }<br>  }<br>[...]<br>} | |

The delta patch data unit syntax (paragraph 7.3.6.4 of w8479) is modified as follows:

| | Descriptor |
|---|---|
| delta_patch_data_unit( patchIndex ) {<br>[...]<br>  if( sps_point_local_reconstruction_enabled_flag ) {<br>    ~~point_local_reconstruction_data(patchIndex)~~<br>    for ( layer = 0 ; layer < sps_layer_count_minus1 + 1;<br>    layer ++ ) {<br>      if (sps_point_local_reconstruction_layer_enabled_flag<br>      [ layer ]<br>    ) {<br>        point_local_reconstruction_data ( patchIndex, layer )<br>      }<br>    }<br>  }<br>[...]<br>} | |

The modified point local reconstruction syntax (clause 7.3.6.6 of w18479) is modified to store all data in a two-dimensional array (layer identifier and patch index). The proposed version is as follows:

| | Descriptor |
|---|---|
| point_local_reconstruction_data( patchIndex, layerId ) {<br>  if( BlockCount ><br>  plri_block_threshold_per_patch_minus1[ layerId ] + 1 )<br>    plrd_level[ layerId ][ patchIndex ]<br>  Else | u(1) |
|     plrd_level[ layerId ][ patchIndex ] = 1<br>  if( plrd_level[ layerId ][ patchIndex ] == 0 ) {<br>    for( i = 0; i < BlockCount; i++ ) {<br>      plrd_present_block_flag[ layerId ][ patchIndex ]<br>      [ i ]<br>      if( plrd_present_block_flag[ layerId ][ patchIndex ]<br>      [ i ] ) {<br>        plrd_block_mode_minus1[ layerId]<br>        [ patchIndex ][ i ]<br>      }<br>    }<br>  } else {<br>    plrd_present_flag[ layerId ][ patchIndex ]<br>    if( plrd_present_flag[ layerId ][ patchIndex ] )<br>      plrd_mode_minus1[ layerId ][ patchIndex]<br>  }<br>} | u(1)<br><br><br><br><br>u(v)<br><br><br><br><br>u(1)<br><br>u(v) |

The following modification has to be applied to the reconstruction process (described in paragraph 9.4.4 of w18479)

When sps_point_local_reconstruction_layer_enabled_flag [ layerIdx ] equals 1, this clause shall be applied to layer with layer index layerIdx.
Inputs to this process are:
- layerIdx of the current layer.
- the plr_mode_interpolate_flag array with the interpolate flag for each block of each patch of the current patch tile group for the current layer layerIdx.
- the plr_mode_neighbour_minus1 array with the neighbourhood size minus 1 for each block of each patch of the current patch tile group for the current layer layerIdx.
- plr_mode_minimum_depth array with the minimum depth for each block of each patch of the current patch tile group for the current layer layerIdx.
- plr_mode_filling_flag, vector with the filling flag for each block of each patch of the current patch tile group for the current layer layerIdx.

In another embodiment, several layers share the same PLR information. The PLR per-block/per-patch mode is still provided per layer. This embodiment allows reducing the bitrate required to send the PLR information at the expense of using the same set of modes for several (eventually all layers, which may slightly reduce the visual quality of the decoded point cloud). One or several sets of PLR information are sent. Since the number of sets of PLR information may be smaller than the number of layers, an index indicates which set of PLR information is used by each layer.

At sequence parameter set syntax level (paragraph 7.3.4.1 of w18479), add the possibility to enable PLR process per layer, as follows:

| | Descriptor |
|---|---|
| sequence_parameter_set( ) { | |
| [...] | |
|   sps_point_local_reconstruction_enabled_flag | u(1) |
|   if( sps_point_local_reconstruction_enabled_flag ) { | |
|     ~~point_local_reconstruction_information()~~ | |
|     sps_point_local_reconstruction_information_num_sets_minus1 | u(4) |
|     for ( setId = 0 ; | |
|       setId < sps_point_local_reconstruction_information_num_sets_minus1 + 1; | |
|       setId ++ ) { | |
|         point_local_reconstruction_information ( setId ) | |
|     } | |
|     for ( layer = 0 ; layer < sps_layer_count_minus1 + 1 ; layer ++ ) | |
|       sps_point_local_reconstruction_layer_enabled_flag | u(1) |
|       [ layer ] | |
|   } | |
| [...] | |
| } | | sps_pointlocal_reconstruction_information_num_setsminus1 plus 1 indicates how many sets of PLR information parameters are sent. The minimum is 1, the maximum is the number of layers. The only change w.r.t. the current specification text is the use of an array (indexed by id) to store the PLR information.

| | Descriptor |
|---|---|
| point_local_reconstruction_information( id ) { | |
|   plri_number_of_modes_minus1[ id ] | u(4) |
|   for( i = 0; i < plri_number_of_modes_minus1 [ id ] + 1; i++ ) { | |
|     plri_interpolate_flag[ id ] [ i ] | u(1) |
|     plri_filling_flag[ id ] [ i ] | u(1) |
|     plri_minimum_depth[ id ] [ i ] | u(2) |
|     plri_neighbour_minus1[ id ] [ i ] | u(2) |
|   } | |
|   plri_block_threshold_per_patch_minus1[ id ] | ue(v) |
| } | |

At patch sequence parameter set syntax level (paragraph 7.3.5.3 of w18479), add the possibility to define a PLR information ID that identifies the PLR information to use by the corresponding layer, as follows:

| | Descriptor |
|---|---|
| patch_sequence_parameter_set( ) { | |
| [...] | |
|   for ( layer = 0 ; layer < sps_layer_count_minus1 + 1 ; layer ++ ) { | |
|     if ( sps_point_local_reconstruction_layer_enabled_flag [ layer ] ) { | |
|       psps_point_local_reconstruction_information_set_id[ layer ] | u(4) |
|     } | |
|   } | |
|   byte_alignement( ) | |
| } | |

The psps_point_local_reconstruction_information_set_id [layer] parameter indicates the index of the PLR information set corresponding to layer with index 'layer.' The following modification has to be applied to the reconstruction process (described in paragraph 9.4.4 of w18479)

When sps_point_local_reconstruction_layer_enabled_flag [ layerIdx ] equals 1, this clause shall be applied to layer with layer index layerIdx.
Inputs to this process are:
- layerIdx of the current layer.
- Index for the PLR information of the current layer, -continued

- psps_point_local_reconstruction_information_set_id[ layerIdx ]
- the plr_mode_interpolate_flag array with the interpolate flag for each block of each patch of the current patch tile group for the current layer layerIdx.
- the plr_mode_neighbour_minus1 array with the neighbourhood size minus 1 for each block of each patch of the current patch tile group for the current layer layerIdx.
- plr_mode_minimum_depth array with the minimum depth for each block of each patch of the current patch tile group for the current layer layerIdx.
- plr_mode_filling_flag, vector with the filling flag for each block of each patch of the current patch tile group for the current layer layerIdx.

In another embodiment, PLR information and shared per-block/-patch mode are shared between multiple layers. This further reduces the bitrate by diminishing the amount of metadata to send, at the expense of a slight reduction on visual quality and/or slight increase in complexity.

The following sections details the proposed changes to the current V-PCC specifications (w18479) in addition to the changes proposed for embodiments described above.

sps_point_local_reconstruction_information_num_sets_minus1 plus 1 indicates how many sets of PLR information parameters are sent. The minimum is 1, the maximum is the number of layers. The only change w.r.t. the current specification text is the use of an additional array (indexed by id) to store the PLR information. At patch sequence parameter set syntax level (paragraph 7.3.5.3 of w18479), add the possibility to indicate the identifier of the corresponding to the PLR information.

The patch data unit syntax (paragraph 7.3.6.3 of w18479) is modified as follows:

| | Descriptor |
|---|---|
| patch_data_unit( patchIndex ) {<br>[...]<br>  if( sps_point_local_reconstruction_enabled_flag ) {<br>    ~~point_local_reconstruction_data(patchIndex)~~<br>    pdu_point_local_reconstruction_data_num_sets_minus1<br>    for ( set_id = 0 ;<br>      set_id < pdu_point_local_reconstruction_data_num_sets_minus1 + 1;<br>      set_id++ ) {<br>        point_local_reconstruction_data( patchIndex, set_id )<br>    }<br>    for ( layer = 0 ; layer < sps_layer_count_minus1 + 1 ; layer ++ ) {<br>      if ( sps_point_local_reconstruction_layer_enabled_flag [ layer ] ) {<br>        pdu_point_local_reconstruction_data_set_id[ patchIndex ][ layer ]<br>      }<br>    }<br>  }<br>} | <br><br><br>u(4)<br><br><br><br><br><br><br><br><br>u(4) |

The pdu_point_local_reconstruction_data_num_sets_minus1 indicates the number of versions of PLR data available per patch. The pdu_point_local_reconstruction_data_set_id [patchIndex][layer] parameter indicates the PLR data set identifier to get the PLR data of patch 'patchIndex' and layer 'layer'.

The delta patch data unit syntax (paragraph 7.3.6.4 of w18479) is modified as follows:

| | Descriptor |
|---|---|
| delta_patch_data_unit( patchIndex ) {<br>[...]<br>  if( sps_point_local_reconstruction_enabled_flag ) {<br>    ~~point_local_reconstruction_data(patchIndex)~~<br>    dpdu_point_local_reconstruction_data_num_sets_minus1<br>    for ( set_id = 0 ;<br>      set_id < dpdu_point_local_reconstruction_data_num_sets_minus1 + 1;<br>      set_id++ ) {<br>        point_local_reconstruction_data( patchIndex, set_id )<br>    }<br>    for ( layer = 0 ; layer < sps_layer_count_minus1 + 1 ; layer ++ ) {<br>      if ( sps_point_local_reconstruction_layer_enabled_flag [ layer ] ) {<br>        dpdu_point_local_reconstruction_data_set_id[ patchIndex ][ layer ]<br>      }<br>    }<br>  }<br>} | <br><br><br>u(4)<br><br><br><br><br><br><br><br><br>u(4) |

The following modification has to be applied to the reconstruction process (described in paragraph 9.4.4 of w18479).

When sps_point_local_reconstruction_layer_enabled_flag [layerIdx] equals 1, this clause shall be applied to layer with layer index layerIdx.
Inputs to this process are:
- layerIdx of the current layer.
- Index for the PLR information of the current layer, psps_point_local_reconstruction_information_set_id [layerIdx]
- Index for the PLR data of the current layer, pdu_point_local_reconstruction_data_set_id[ patchIndex ]
- [layerIdx ] the plr_mode_interpolate_flag array with the interpolate flag for each block of each patch of the current -continued patch tile group for the current layer layerIdx.
- the plr_mode_neighbour_minus1 array with the neighbourhood size minus 1 for each block of each patch of the current patch tile group for the current layer layerIdx.
- plr_mode_minimum_depth array with the minimum depth for each block of each patch of the current patch tile group for the current layer layerIdx.
- plr_mode_filling_flag, vector with the filling flag for each block of each patch of the current patch tile group for the current layer layerIdx.

In a variant, the patch data unit and delta patch data unit are simplified as follows compared to the current embodiment, as only the PLR data has to be retrieved at patch level.

| | Descriptor |
|---|---|
| patch_data_unit( patchIndex ) {<br>[...]<br>  if( sps_point_local_reconstruction_enabled_flag ) { | |

|  | Descriptor |
|---|---|
| <pre>    ~~point_local_reconstruction_data(patchIndex)~~
    for ( set_id = 0 ;
      set_id <
      pfps_point_local_reconstruction_data_num_sets_minus1 + 1;
      set_id++ ) {
        point_local_reconstruction_data( patchIndex, set_id )
    }
  }
}
delta_patch_data_unit( patchIndex ) {
[...]
  if( sps_point_local_reconstruction_enabled_flag ) {
    ~~point_local_reconstruction_data(patchIndex)~~
    for ( set_id = 0 ;
      set_id < pfps_point_local_reconstruction_data_num_sets_minus1 + 1;
      set_id++ ) {
        point_local_reconstruction_data( patchIndex, set_id )
    }
  }
}
patch_frame_parameter_set( ) {
[...]
  if( sps_point_local_reconstruction_enabled_flag ) {
    <b>pfps_point_local_reconstruction_data_num_sets_minus1</b></pre> | u(4) |
| <pre>    for ( layer = 0 ; layer < sps_layer_count_minus1 + 1 ; layer ++ ) {
      if ( sps_point_local_reconstruction_layer_enabled_flag [layer ] ) {
        <b>pfps_point_local_reconstruction_data_set_id</b>[ layer ]</pre> | u(4) |
| <pre>      }
    }
  }
  byte_alignment( )
}</pre> | | pfps_point_local_reconstruction_data_num_sets_minus1 indicates the number of sets for the PLR data.

pfps_point_local_reconstruction_data_set_id indicates which set of PLR data should be used among the pfps_pointjlocal_reconstruction_data_num_sets_minus1 possible versions.

In another variant of the same embodiment, the higher bitrate reduction by sending the set identifier for the PLR data only once per sequence and per layer. The word "sequence" is used here in the same sense as in the HEVC standard.

The patch data unit and delta patch data unit are simplified as follows compared to current embodiment, as only PLR data has to be retrieved at patch level.

|  | Descriptor |
|---|---|
| <pre>patch_data_unit( patchIndex ) {
[...]
  if( sps_point_local_reconstruction_enabled_flag ) {
    ~~point_local_reconstruction_data(patchIndex)~~
    for ( set_id = 0 ;
      set_id < psps_point_local_reconstruction_data_num_sets_minus1 + 1;
      set_id++ ) {
        point_local_reconstruction_data( patchIndex, set_id )
    }
  }
}
delta_patch_data_unit( patchIndex ) {
[...]
  if( sps_point_local_reconstruction_enabled_flag ) {
    ~~point_local_reconstruction_data(patchIndex)~~
    for ( set_id = 0 ;
      set_id < psps_point_local_reconstruction_data_num_sets_minus1 + 1;
      set_id++ ) {
        point_local_reconstruction_data( patchIndex, set_id )
    }
  }
}</pre> | |

| | Descriptor |
|---|---|
| patch_sequence_parameter_set( ) {<br>[...]<br>  if( sps_point_local_reconstruction_enabled_flag )<br>    psps_point_local_reconstruction_data_num_sets_minus1<br>    for ( layer = 0 ; layer < sps_layer_count_minus1 + 1 ; layer ++ ) {<br>      if ( sps_point_local_reconstruction_layer_enabled_flag [layer ] )<br>      {<br>psps_point_local_reconstruction_information_set_id [ layer ]<br>psps_point_local_reconstruction_data_set_id [ layer ]<br>      }<br>    }<br>  byte_alignement( )<br>} | <br><br><br>u(4)<br><br><br><br>u(4)<br>u(4) | psps_point_local_reconstruction_data_num_sets_minus1 defines the number of sets for the PLR data.

psps_point_local_reconstruction_data_set_id indicates what set of PLR data should be used among the psps_point_local_reconstruction_data_num_sets_minus1 plus 1 possible versions.

Modifications to the reconstruction process are the following ones:

pdu_point_local_reconstruction_data_set_id[f][p][1] of E3 is initialized to:

pfps_point_local_reconstruction_data_set_id[f][1] for E3.V1; i.e. for a given frame, all patches use the same set id;

psps_point_local_reconstruction_data_set_id[1] for E3.V2; i.e. for all frames, all patches use the same set id.

Where f corresponds to the frame index;

p corresponds to the patch index;

l corresponds to the layer index.

Compared to the current embodiment, the number of sets for PLR data is indicated:

at frame level (for E3.V1) with pfps_point_local_reconstruction_data_num_sets_minus1, or sequence level (for E3.V2) with psps_point_local_reconstruction_data_num_sets_minus1.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure. is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Note that the syntax elements as used herein, for example, the flag point_local_reconstruction_mode_present_flag is a descriptive term. As such, they do not preclude the use of other syntax element names.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular syntax element SE and/or PLR metadata. In this way, in an embodiment the same parameter (PLR metadata) may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for decoding a 3D point cloud, the method comprising:
   decoding a first layered image and associated first metadata from a data stream, said first metadata comprising a first information indicating whether said first layered image is to be decoded according to a point local reconstruction method; and
   on condition that said first information is enabled:
      retrieving first point local reconstruction information and first point local reconstruction modes in said first metadata, and
      applying said first point local reconstruction modes to said first layered image according to said first point local reconstruction information to reconstruct said 3D point cloud; and
   decoding a second layered image and associated second metadata from said data stream, said second metadata comprising a second information indicating whether said second layer image is to be decoded according to a point local reconstruction method and according to an index that points to said first point local reconstruction information; and on condition that said second information is enabled:
  retrieving second point local reconstruction modes in said second metadata, and
  applying said second point local reconstruction modes to said second layered image according to said first point local reconstruction information to reconstruct said 3D point cloud.

2. The method of claim 1, further comprising:
decoding a third layered image and associated third metadata from said data stream, said third metadata comprising a third information indicating whether said third layer image is to be decoded according to a point local reconstruction method and according to an index that points to said first or to said second point local reconstruction modes; and on condition that said third information is enabled:
  retrieve third point local reconstruction information in said third metadata, and
  applying said first or said second point local reconstruction modes to said third layered image according to said third point local reconstruction information to reconstruct said 3D point cloud.

3. The method of claim 2, further comprising:
decoding a fourth layered image and associated fourth metadata from said data stream, said fourth metadata comprising a fourth information indicating whether said fourth layer image is to be decoded according to a point local reconstruction method, according to an index that points to said first or to said second or to said third point local reconstruction information and according to an index that points to said first or to said second or to said third point local reconstruction modes; and on condition that said fourth information is enabled, applying said first or said second or said third point local reconstruction modes to said fourth layered image according to said first or said second or said third point local reconstruction information to reconstruct said 3D point cloud.

4. A device for decoding a 3D point cloud, the device comprising a processor configured for:
decoding a first layered image and associated first metadata from a data stream, said first metadata comprising a first information indicating whether said first layered image is to be decoded according to a point local reconstruction method; and on condition that said first information is enabled:
  retrieving first point local reconstruction information and first point local reconstruction modes in said first metadata, and
  applying said first point local reconstruction modes to said first layered image according to said first point local reconstruction information to reconstruct said 3D point cloud and decoding a second layered image and associated second metadata from said data stream, said second metadata comprising a second information indicating whether said second layer image is to be decoded according to a point local reconstruction method and according to an index that points to said first point local reconstruction information; and on condition that said second information is enabled:
  retrieve second point local reconstruction modes in said second metadata, and
  applying said second point local reconstruction modes to said second layered image according to said first point local reconstruction information to reconstruct said 3D point cloud.

5. The device of claim 4, said processor further configured for:
decoding a third layered image and associated third metadata from said data stream, said third metadata comprising a third information indicating whether said third layer image is to be decoded according to a point local reconstruction method and according to an index that points to said first or to said second point local reconstruction modes; and on condition that said third information is enabled:
  retrieve third point local reconstruction information in said third metadata, and
  applying said first or said second point local reconstruction modes to said third layered image according to said third point local reconstruction information to reconstruct said 3D point cloud.

6. The device of claim 5, said processor further configured for:
decoding a fourth layered image and associated fourth metadata from said data stream, said fourth metadata comprising a fourth information indicating whether said fourth layer image is to be decoded according to a point local reconstruction method, and according to an index that points to said first or to said second or to said third point local reconstruction information and according to an index that points to said first or to said second or to said third point local reconstruction modes; and on condition that said fourth information is enabled, applying said first or said second or said third point local reconstruction modes to said fourth layered image according to said first or said second or said third point local reconstruction information to reconstruct said 3D point cloud.

7. A method for encoding a 3D point cloud, the method comprising:
encoding a first layered image and associated first metadata in a data stream, said metadata comprising:
  a first information indicating whether said first layered image is to be decoded according to a point local reconstruction method; and
  on condition that said first information is enabled, a first point local reconstruction information and first point local reconstruction modes; and encoding a second layered image and associated second metadata in said data stream, said second metadata comprising:
  a second information indicating whether said second laver image is to be decoded according to a point local reconstruction method;
  an index that points to said first point local reconstruction information; and
  on condition that said second information is enabled, second point local reconstruction modes.

8. The method of claim 7, further comprising:
encoding a third layered image and associated third metadata in said data stream, said third metadata comprising:
  a third information indicating whether said third layer image is to be decoded according to a point local reconstruction method;

an index that points to said first or to said second point local reconstruction modes; and on condition that said third information is enabled, a third point local reconstruction information.

9. The method of claim 8, further comprising:

encoding a fourth layered image and associated fourth metadata in said data stream, said fourth metadata comprising:

a fourth information indicating whether said fourth layer image is to be decoded according to a point local reconstruction method;

an index that points to said first or to said second or to said third point local reconstruction information; and an index that points to said first or to said second or to said third point local reconstruction modes.

10. A non-transitory computer readable medium containing data content generated according to the method of claim 7, for playback using a processor.

11. A device for encoding a 3D point cloud, the device comprising a processor configured for:

encoding a first layered image and associated first metadata in a data stream, said metadata comprising:

a first information indicating whether said first layered image is to be decoded according to a point local reconstruction method; and on condition that said first information is enabled, a first point local reconstruction information and first point local reconstruction modes; and encoding a second layered image and associated second metadata in said data stream, said second metadata comprising:

a second information indicating whether said second layer image is to be decoded according to a point local reconstruction method;

an index that points to said first point local reconstruction information; and on condition that said second information is enabled, second point local reconstruction modes.

12. The device of claim 11, said processor further configured for:

encoding a third layered image and associated third metadata in said data stream, said third metadata comprising:

a third information indicating whether said third layer image is to be decoded according to a point local reconstruction method;

an index that points to said first or to said second point local reconstruction modes; and on condition that said third information is enabled, a third point local reconstruction information.

13. The device of claim 12, said processor further configured for:

encoding a fourth layered image and associated fourth metadata in said data stream, said fourth metadata comprising:

a fourth information indicating whether said fourth layer image is to be decoded according to a point local reconstruction method;

an index that points to said first or to said second or to said third point local reconstruction information; and an index that points to said first or to said second or to said third point local reconstruction modes.

* * * * *